United States Patent
DeLia (10) Patent No.: US 10,240,849 B2
(45) Date of Patent: Mar. 26, 2019

(54) AMBIENT REFRIGERATION SYSTEM

(71) Applicant: Nordic Refrigeration, Inc., Gypsum, CO (US)

(72) Inventor: Richard DeLia, Avon, CO (US)

(73) Assignee: Nordic Refrigeration, Inc., Avon, CO (US)

(*) Notice: Subject to any disclaimer, the term of this patent is extended or adjusted under 35 U.S.C. 154(b) by 857 days.

(21) Appl. No.: 14/403,951

(22) PCT Filed: Mar. 11, 2014

(86) PCT No.: PCT/US2014/023717
§ 371 (c)(1),
(2) Date: Nov. 25, 2014

(87) PCT Pub. No.: WO2014/164892
PCT Pub. Date: Oct. 9, 2014

(65) Prior Publication Data
US 2016/0003517 A1    Jan. 7, 2016

Related U.S. Application Data

(60) Provisional application No. 61/776,631, filed on Mar. 11, 2013.

(51) Int. Cl.
*F25D 17/06* (2006.01)
*F25D 13/00* (2006.01)
*F25D 1/00* (2006.01)

(52) U.S. Cl.
CPC ............ *F25D 17/06* (2013.01); *F25D 13/00* (2013.01); *F25D 1/00* (2013.01); *Y02A 40/964* (2018.01)

(58) Field of Classification Search
CPC .............. F25D 16/00; F24F 2011/0002; F24F 2011/0006; Y02B 30/54; Y02B 30/542
See application file for complete search history.

(56) References Cited

U.S. PATENT DOCUMENTS 2,193,923 A    3/1940  Hillen et al.
4,023,947 A    5/1977  Ferry
(Continued)

FOREIGN PATENT DOCUMENTS

CN    101929724 A    12/2010
GB      2480477 A    11/2011

OTHER PUBLICATIONS

International Application No. PCT/US2014/023717 filed Mar. 11, 2014.
(Continued)

*Primary Examiner* — Jonathan Bradford
(74) *Attorney, Agent, or Firm* — Santangelo Law Offices, P.C.

(57) ABSTRACT

The present the inventive technology is directed to improved methods and apparatus for the refrigeration of an enclosed space using external ambient air as a cooling medium. The inventive technology may cool an enclosed space utilizing, for example a modular designed duct system that may deliver a specific volume of supply air to an enclosed space at a specific temperature differential (TD) in relation to a desired set point of the enclosed space. This may be accomplished by mixing cold outside air and return air, or even running the return air through a fluid heat transfer chiller coil that may be cooled to varying temperatures by outside air utilizing an external chilling unit.

59 Claims, 5 Drawing Sheets

(56) References Cited

U.S. PATENT DOCUMENTS

| | | | |
|---|---|---|---|
| 4,147,038 A | | 4/1979 | Hoebing et al. |
| 4,175,401 A | | 11/1979 | McManus |
| 4,178,770 A | | 12/1979 | Fox |
| 4,244,193 A | | 1/1981 | Haakenson |
| 4,272,966 A | | 6/1981 | Niemann et al. |
| 5,239,834 A | | 8/1993 | Travers |
| 5,485,787 A | | 1/1996 | Derks |
| 7,629,141 B2 | | 12/2009 | Bruce et al. |
| 9,739,497 B2 | * | 8/2017 | Dobbs .................. F24F 3/1405 |
| 2004/0108388 A1 | | 6/2004 | Wacker |
| 2010/0012291 A1 | * | 1/2010 | Sporie .................. F24F 5/0035 |
| | | | 165/61 |
| 2010/0154448 A1 | * | 6/2010 | Hay .................. H05K 7/20745 |
| | | | 62/175 |
| 2011/0172831 A1 | * | 7/2011 | Kreft ...................... F24F 3/044 |
| | | | 700/278 |
| 2011/0197608 A1 | | 8/2011 | Yamashita et al. |
| 2012/0247135 A1 | | 4/2012 | Fakieh |
| 2012/0267069 A1 | * | 10/2012 | Seeliger .................. F24F 13/30 |
| | | | 165/86 |
| 2013/0045671 A1 | * | 2/2013 | Apple .................. F24F 11/0001 |
| | | | 454/239 |

OTHER PUBLICATIONS

International Application No. PCT/US2014/023717, Written Opinion dated Jul. 15, 2014.

International Application No. PCT/US2014/023717, International Search Report dated Jul. 15, 2014.

\* cited by examiner

AMBIENT REFRIGERATION SYSTEM

This application is the United States National Stage of International Application No. PCT/US2014/023717, filed Mar. 11, 2014, which claims the benefit of and priority to U.S. Provisional Application No. 61/776,631, filed on Mar. 11, 2013. The entire specification and figures of the above-mentioned applications are hereby incorporated, in their entirety by reference.

TECHNICAL FIELD

The inventive technology generally relates to the field of refrigeration. In particular the inventive technology is directed to improved methods and apparatus for the refrigeration of an enclosed space using external ambient air as a cooling medium.

BACKGROUND

Refrigeration systems that use external ambient air to refrigerate an enclosed space have been previously attempted by those in the field with limited success. Specifically, such traditional external ambient air refrigeration systems are limited by several physical, as well as, design aspects reducing their effectiveness if not rendering them completely non-functional. Examples of these limited and in actuality non-functional systems have been previously described in U.S. Pat. Nos. 5,239,834, 4,619,114, 4,175,401, 4,178,770, 4,023,947, 4,147,038, 4,272,966 and 4,244,193 which are all hereby incorporated in their entirety by reference. For example, as generally described in the above references, traditional refrigeration systems may bring external ambient air directly into a refrigerated space and exhaust warmer air. Such systems generally require the use of an air-to-air heat exchanger to transfer cold outside air to warmer air recirculating from the refrigerated space without ever mixing the two air streams. However, there have been no inventions that use the same methodology as the invention described below.

In a preferred embodiment, the inventive technology may cool an enclosed space utilizing, for example, a modular designed duct system that may deliver a specific volume of supply air to an enclosed space at a specific temperature differential (TD) in relation to a desired set point of the enclosed space. This may be accomplished by mixing cold outside air and return air, or even running the return air through a fluid heat transfer chiller coil that may be cooled to varying temperatures by outside air utilizing an external chilling unit. The improvements of inventive technology overcome the aforementioned systems and address the need to maintain the quality and integrity of any product stored in the refrigerated space by not subjecting it to extreme temperature swings, thereby maintaining a more constant holding temperature similar to the way existing conventional mechanical refrigeration systems—those with a closed loop configuration having a condenser and evaporator—operate, but with a fraction of the energy consumption.

It should be noted that the foregoing problems regarding refrigeration systems and processes may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

DISCLOSURE OF INVENTION(S)

In a preferred embodiment, the inventive technology may be configured to refrigerate enclosed spaces that may need to be kept at temperatures colder than normal living spaces. Notable examples would include storage spaces such as walk-in coolers, walk-in freezers, wine rooms, electronics rooms, food prep rooms, and the like. However, it should be noted that the inventive technology is not limited to these examples only and can be scaled to cool a variety of refrigerated spaces, large or small. Additionally, in some embodiments the inventive technology may be adapted for use in geographic locations where outside temperatures get at least as cold as the desired set point of the refrigerated space and a specified temperature differential below a set point that may be desired to preserve the quality of any product stored in the enclosed space.

One objective of the inventive technology may be to reduce the energy consumption of a conventional refrigeration system by efficiently refrigerating an enclosed space utilizing external ambient air the term being generally interchangeable with outside air. Another objective of the inventive technology may be to efficiently refrigerate an enclosed space by using outside air as the cooling medium in a manner that addresses the quality of whatever product might be stored in the refrigerated space. For example, generally in order for a refrigeration system to provide efficient cooling of an enclosed space, it may be required to supply air at a temperature colder than the temperature of the enclosure. The difference between the supply air temperature and the temperature of the refrigerated space may be referred to as a temperature differential (TD). Different TD's may have different effects on the rate of cooling and humidity at different temperature levels. Since many products that are stored in refrigerated spaces, such as food and beverages, are often sensitive to temperature changes and humidity, it may be beneficial to control the TD of the supply air to preserve the quality of the product stored in the refrigerated space. Also, since different products may have different quality standards, it may be necessary for the invention to be adjustable or programmable or both in regards to a TD setting.

Another objective of the inventive technology may be to simulate a mechanical refrigeration system, while consuming less energy. Simulating the effects of a mechanical refrigeration system may allow the invention to run completely on its own and still achieve proper cooling and quality control of a refrigerated space utilizing, for example, cold outside air. This inventive technology may also be designed to run in conjunction with an existing mechanical refrigeration system, such as a traditional system having an evaporator and condenser to cool an enclosed refrigerated space. In certain embodiments, only the mechanical refrigeration system may be running at certain times to cool an enclosed refrigerated space even while coupled with the inventive technology. At other times, only the invention may be running to cool an enclosed refrigerated space. However, in certain environments or embodiments, a mechanical refrigeration system may not be necessary at all as the enclosed refrigerated space may be sufficiently cooled through operation of said invention alone.

Another objective of the inventive technology may be the application of a control system. In some embodiments a sensor and/or controller element may be able to sense temperature, air pressure, air flow and humidity in a number of places inside the refrigerated space, inside the duct system, and/or externally depending on invention variations and installation applications. Such a control system may be a fully automated control, a manual control, and/or a combination of the two. In some embodiments, this combination could include a normally automated control with manual overrides, or a normally manual operated control, with automated features. Based on the control's inputs, the control may dictate when the invention should run and when for example, a coupled mechanical refrigeration system should run. For example, when the invention is operating, such inputs may dictate the operation of any and all dampers and/or fan motor(s) in the air handling container and/or duct system. In variations of the invention that include a chilled fluid system, the inputs may dictate the operation of any and all fan motors, fluid pumps, and/or mixing valves and the like.

In one embodiment, if the outside air temperature is at or below a predetermined level (which may include the desired set point and a sufficient TD), the mechanical refrigeration system may turn off and the invention may turn on or, perhaps alter their output levels respectively. In another embodiment, if the outside air temperature is at or above a predetermined level, the mechanical refrigeration system may turn on and the invention may turn off or, perhaps alter their output levels respectively. Through such a control system, there could also be built in fail-safes that may turn the mechanical refrigeration system on, and the invention off or, perhaps alter their output levels respectively. This control system may also be programmed to turn the invention off and turn the mechanical refrigeration system on, or perhaps alter their output levels if a maximum allowable humidity level is reached inside the refrigerated space, even if the outside temperature is at or below a predetermined level, in order to maintain a desired humidity level among other effects. Additionally, such a control system may include a feature that may turn off the invention and turn on the mechanical refrigeration system or, perhaps alter their output levels if the invention has been running at or near full capacity for a predetermined amount of time and the refrigerated space has not reached its set point, even if the outside temperature is below the predetermined level, in order to maintain a more constant holding temperature. Such a control feature may include a safety monitoring system that may be dynamically responsive to any of the elements and/or outputs described herein to achieve and/or maintain a desired and/or preset set-point, temperature or TD and the like. Such a feature may help prevent product spoilage.

Another feature of such a control system may include a mechanism whereby when a coupled mechanical refrigeration system is turned on it may run for a minimum specified period of time before shutting off, even if outside air and refrigerated space humidity are below their respective predetermined levels to perhaps, make sure that the mechanical refrigeration system does not short cycle. There may be other control features to periodically turn on a coupled mechanical refrigeration system to a certain or pre-determined level so as to perhaps to keep the mechanical system well lubricated, even if outside air and refrigerated space humidity are below their respective predetermined levels. This control element may also include a way to conveniently indicate to the user what is taking place with the system through an indicator signal. Example of such may include LED indicator lights, a digital display read-out, an LED or LCD display, and the like or any combination thereof.

Additional embodiments of the inventive technology may include an insulated air handling container and duct system. Such a system may circulate air from a refrigerated space via one or more return air ducts into the air handling container or box where it may be conditioned to a predetermined temperature, humidity, TD or the like. The system then may further supply the conditioned air back to the refrigerated space at, for example, a specific TD via one or more supply air ducts. In one embodiment of the invention the air may be conditioned to a predetermined TD by mixing it directly with, preferably cold outside air through the use of dampers and/or a fan in the air handling box. In this embodiment, it may also be possible to include an air pressure relief damper on, for example, the return air duct, or in the wall of the refrigerated space to make sure the refrigerated space does not get over pressurized. The control described above may be used to adjust the return air and outside air dampers to properly mix the air to the correct temperature, humidity, TD or the like. Moreover, the control system could also be used to dictate when the fan should run and/or how fast the fan should run if it is a variable- and/or multi-speed fan.

In another embodiment of the invention, the air may be conditioned to, for example a predetermined TD by using a fan to blow or pull the air through, for example a fluid heat transfer chiller coil positioned in an air handling container before supplying the air back to the refrigerated enclosure. This fluid heat transfer chiller coil may be part of a circulating loop that pumps a fluid through an external chiller coil that may have cold outside air blowing over it to cool the solution before it flows inside to the coil in the air handling container where it may absorb the heat of the recirculating air from the refrigerated space, and then may be pumped back outside to reject the heat. There may also be a control element such as the one described above that is used to regulate the temperature and flow of the chilled fluid loop in accordance with the fan in the air handling box to ensure the air being supplied to the refrigerated space is, for example, at or near a predetermined TD. In a preferred embodiment, there may also be a mixing valve incorporated in the circulating loop to temper the chilled fluid that is entering the inside coil to help maintain, in this case the proper TD.

Additional embodiments may include an air handling container described above, which may be configured to have a modular design for ease of installation in many applications. The air handling container may be installed inside or outdoors, and either sitting on the floor or roof, hanging from the ceiling, or attached to a wall. The air handling box may also be constructed of removable and reversible panels to allow the installer to conveniently hook up the air inlet and outlet ducts to the top, bottom, ends, or sides of the box. Such modular design may allow for the inventive technology to be easily retrofitted, such as in a kit to existing refrigeration systems and enclosures to replace and/or supplement traditional mechanical refrigeration system.

One of the many advantages of the current invention is the ability to use an air handling container that can accommodate various heat load requirements of different sized enclosures such as a ½-25 ton enclosures or more, wherein a ton comprises 12,000 BTU's, but larger as well as smaller enclosures are also contemplated. This variability may be accomplished perhaps through a plurality of inventions coupled together, and/or a single and/or multiple inventions of variable sizes and/or capacities. This may be accomplished in some embodiments by using a variable- and/or multi-speed fan that may adjust to the cooling demand of the refrigerated enclosure. With larger spaces such a fan may run faster, and with smaller spaces the fans may run slower to make sure the refrigerated enclosure has sufficient cooling. In some embodiments, more than one air handling container may be installed to meet larger cooling demands. In such a situation, the controllers of each air handling box may be networked together, independently or perhaps in series or parallel. In one embodiment, all air handling containers may be independently controlled or they may run off a single controller to ensure that all air handling boxes are receiving approximately the same or a predetermined input and output.

Another advantage of the current inventive technology is the ability to provide a predetermined level of circulating air within the refrigerated enclosure. Such predetermined air circulation may allow the system to deliver approximately equal cooling throughout the space similar to the way conventional mechanical refrigeration systems operate. In a preferred embodiment, this may be achieved by allowing an existing evaporator fan motor to continue to run when the rest of the mechanical refrigeration system turns off and the invention turns on. This may also be achieved by using a powerful enough fan in the air handling box to deliver enough CFM (cubic feet per minute) of air through an supply air duct(s) to fully and/or evenly circulate the air throughout the box. This could also be achieved by replacing existing evaporator fan motors with variable speed ECM, or multi-speed motors, if the evaporator does not already have such motors, and then having these motors run at a lower speed when the rest of the mechanical refrigeration system turns off and the invention turns on.

In still other embodiments, the inventive technology may incorporate varying types and levels of air filtration. In certain versions of the invention that, for example, use a direct external ambient air duct, it may be beneficial to filter any outside air that is brought into the refrigerated space in order to keep the air clean inside the refrigerated space and/or inside the air handling container. Different levels of air filtration may be utilized depending on the desired quality of air inside the refrigerated enclosure and the quality (or lack thereof) of the air outside. For example, there could be charcoal filters, HEPA filtration, UV light, and pleated filters of various sizes and MERV ratings. Filters may be placed in different locations throughout the invention's air mixing box, and/or the outside air duct. Furthermore, in any version of the invention, filters may also be placed in the return air duct to filter any recirculating air from the refrigerated space.

Another embodiment of this invention may allow air recirculation and/or air replacement features. These features may allow the invention to periodically turn on with or without cooling the refrigerated space in order to keep the air in the refrigerated space from getting stale or stagnant. This feature may be combined with certain filter features to help decrease any airborne pollutants that may be present or possible in the refrigerated space. Naturally these and other aspects, goals and embodiments are discussed in the following specification and claims.

MODE(S) FOR CARRYING OUT THE INVENTION(S)

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
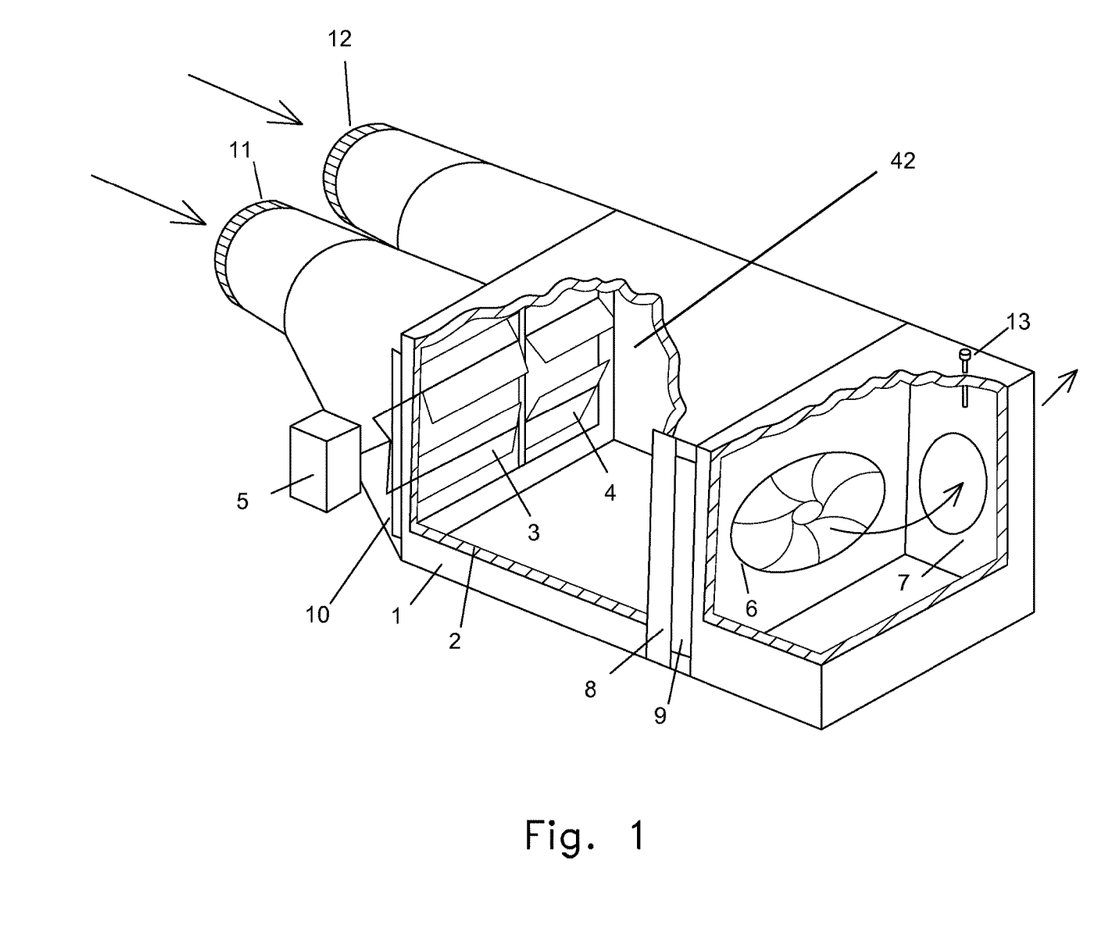
FIG. 1: depicts a perspective view of an embodiment which may contain ducts and an air handling container as shown.
Figure 2:
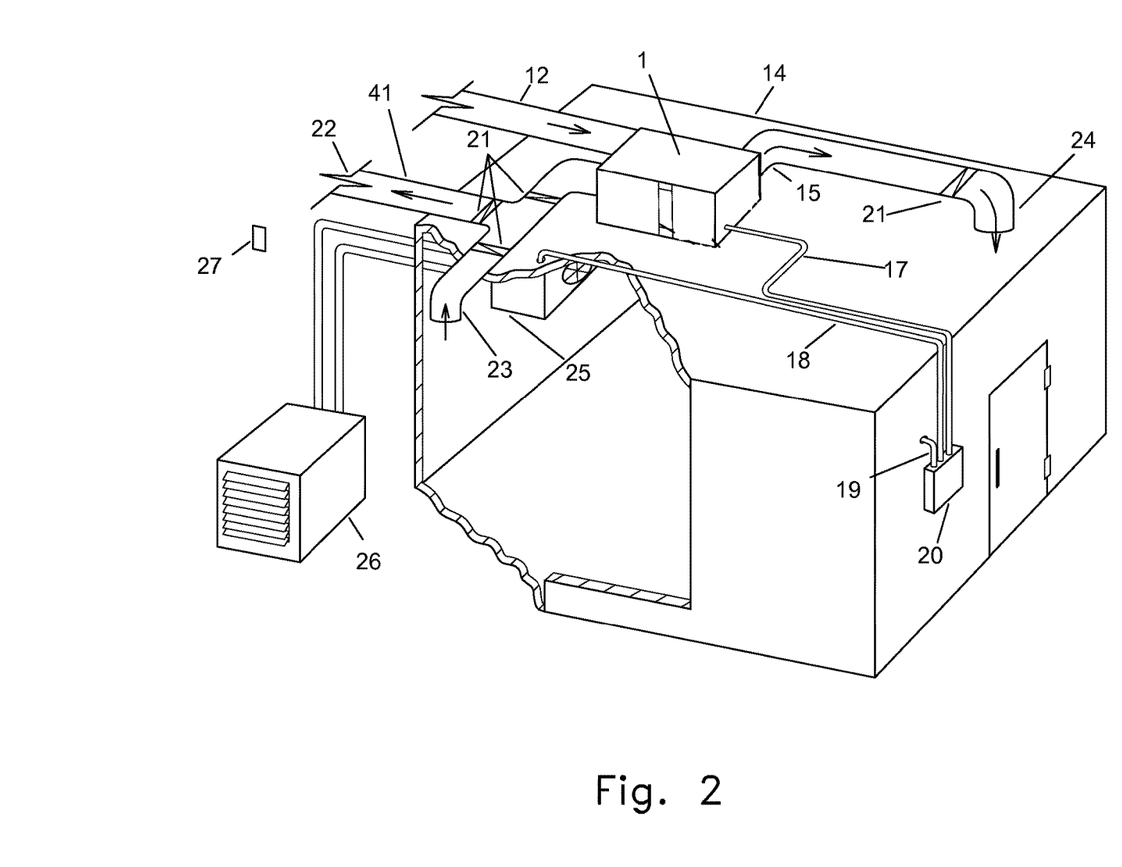
FIG. 2: depicts an embodiment which contains ducts and an air handling container, as such may be installed on a refrigerated space as one example.

As shown generally in FIGS. 1-2, one preferred embodiment of the current inventive technology may include an ambient air refrigeration system. In this preferred embodiment, the air handling container (1) may have an outer shell which may be constructed of various materials such as sheet metal, or plastic, or any other appropriate material sufficient to withstand the demands of the invention in its given application. The air handling container's shell may also include a layer of insulation (2) to perhaps prevent heat gain on the air inside the box and/or prevent condensation outside the box. Various forms of insulation (2) maybe contemplated such as foam board insulation or fibrous insulation or any other form of insulation suitable to fit the needs of the invention in its given application, or any combination of such insulators. The insulation may be placed inside the air handling container (1) as depicted, but it may also be possible to insulate the outside of air handling container (1). Such insulation may be formed of a mesh internally positioned within an air handling container's (1) wall, such as an internal cavity.

Again referring to FIG. 1, in a preferred embodiment the air handling container (1) may be coupled to at least one return air duct (11) and maybe be further coupled to an enclosed refrigerated space (14). In addition, the air handling container (1) may also be coupled to at least one external air duct (12) that may be further coupled to an enclosed refrigerated space (14). It should be noted that such couplings may form fluidically coupled joints allowing for the free flow of air among the various described element. As noted in FIG. 1, the air handling container (1) may have an existing mechanical refrigeration system that is responsive to said enclosed refrigerated space. In this embodiment this mechanical refrigeration system is initially described as an externally positioned mechanical condenser (26) responsive to a mechanical evaporator (25) positioned within the enclosed refrigerated space (14).

Again referring to FIG. 1, air flow may be regulated in and out of said air handling container (1) by at least one air flow regulator which may be coupled with said return air duct (11) and/or said external air duct (12). In a preferred embodiment, this air flow regulator may include one or more dampers. As shown in FIG. 1, a return air damper (3) external air damper (4) may be bracketed over the opening of said return air duct (11) and external air duct (12) in the air handling container (1) respectively. These dampers may be responsive to a damper actuator motor (5), which in this case is positioned outside the air handling container (1). In a preferred embodiment, this return air damper (3) as well as external air damper (4) may be modulated so as to allow a desired quantity of return and/or external ambient air into the air handling container (1). These dampers may work in conjunction, or independently. In some embodiments the dampers are activated proportionally such that when one is opened the other may be closed to an equal degree. In further embodiments such activation may be accomplished through the dynamic, or continuous modulation of a return air damper (3) and external air damper (4). In a preferred embodiment, one or more damper actuator motors (5) may be responsive to a sensor, such as a supply air sensor (13) and/or an external air sensor (27) and/or controller element (20), and may automatically be adjusted to obtain a desired temperature, pressure, air flow, TD and/or humidity for example. As stated above, the controller element (20) can control both the return air damper (3) and the external air damper (4) to serve as, for example, an external-return air flow mix regulation controller that acts on the regulator which can regulate both dampers and thus serve as an external-return air flow mix regulator.

Again referring to FIGS. 1-3, in a preferred embodiment a quantity of external ambient air drawn may be into the air handling container (1) through said external air duct (12). In addition, a quantity of refrigerated, or return air may be drawn into the air handling container (1) through a return air duct (11) such that both quantities are mixed forming a quantity of conditioned air. Such conditioned air may have a target temperature, pressure, air flow, TD and/or humidity for example. Again as shown in FIG. 1, in one embodiment these quantities of external ambient and refrigerated or return air may be drawn into the air handling container (1) through the action of an air displacement element (6), such as a fan or other like device.

Figure 3:
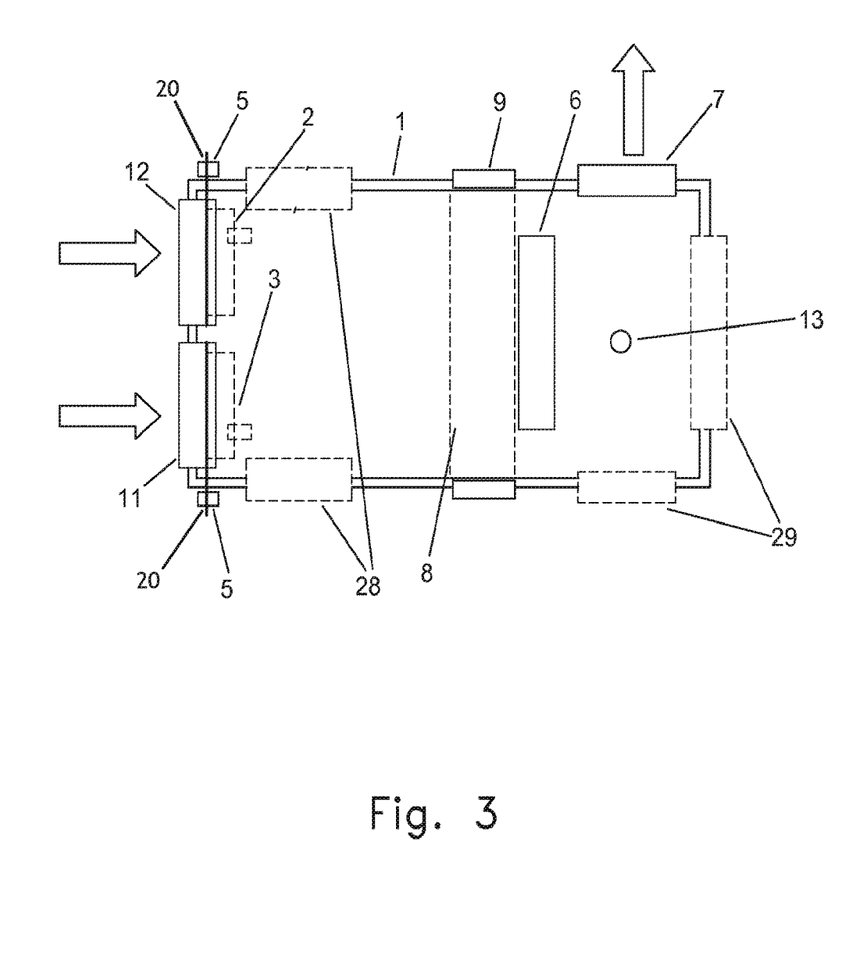
FIG. 3: depicts a top view of the embodiment of FIG. 1 with the ducts and an air handling container.

Again demonstrated in FIGS. 1-3, this conditioned air may be directed into a supply air duct aperture (7) and into a supply air duct (15), again perhaps through the action of an air displacement element (6). This conditioned or supply air may then be redirected into said enclosed refrigerated space through said supply air duct (15). This air draw and redirection through the action of an air displacement element (6) may, in a preferred embodiment be accomplished by a fan element. Naturally, a variety of different style fans can be used in conjunction with the air handling container (1). such as an inducer, blower, air-over fan, belt driven fan, squirrel cage fan, or in line duct fan and the like. Such fan element may be a variable speed fan or a single speed fan or a multiple speed fan and may be responsive to a sensor (13, 27) and/or controller element (20) described above to ensure supply air is delivered to the refrigerated space.

As noted previously, as shown in FIG. 1, the air handling container (1) may include a space for filters elements accessed through one or more filter access panel (9). These filters may be in different locations throughout the box. For example, there may be a space for a pre-filter (10) positioned before air enters the air handling container (1), as well as a secondary filter (8) positioned before air enters the air handling container (1) into a supply air duct (15). It should be noted however, there may also be filtration elements outside the building before any air enters the outside air inlet duct. Note that the inlets and/or outlets may be located in a plurality of locations such as any variation of ends, sides, top, or bottom for ease of installation purposes.

Aging referring to FIGS. 2-3, additional embodiments may include an air handling container (1) with one or more inlet air taps (16a) and/or outlet air taps (16b). As specifically demonstrated in FIG. 3, additional embodiments may include an air handling container (1) with one or more air inlet ports (28) air outlet ports (29). There may also be an additional exhaust duct (41) that may be coupled with a return air duct (11) with one or more back draft dampers (21) as well as perhaps an exhaust air back draft damper (22) coordinated with the return air duct to perhaps relieve excess pressure from the enclosed refrigerated space (14), without letting air in. Additional embodiments may include an exhaust duct (41) coupled directly with the enclosed refrigerated space (14). This exhaust may also have one or more back draft damper (21) as well as perhaps an exhaust duct fan (40) to draw return air out of the enclosed refrigerated space (14), for example to prevent excess humidity and or pressure within the enclosure. As can also be seen in FIG. 1, both the return air duct (11), external air duct (12) and supply air ducts (15) may also be coupled with back draft dampers (21) to prevent a back-flow of air. Moreover, such ducts may also be coupled with register element (23,24) to ensure even distribution of air flow as well as possibly providing additional filtration points.

FIG. 3 provides a schematic/plan view of the air handling container (1) from FIGS. 1 and 2 in one alternative embodiment. It demonstrates the air handling container (1) insulated walls with reversible external air (4) and return air inlet dampers (2), with their respective individual actuators (5). It also demonstrates an exemplary filter space (6) that may be placed in front of a fan element that forces the conditioned air through the supply air duct (15) to be delivered, for example to the refrigerated space. FIG. 3 also illustrates the locations of various air inlets and outlets that may be available with the modular design. Additionally, there may be filter access panels (9) as well as a depiction of where the damper actuators and linkages, may be positioned if they are installed, for example, inside the air handling container (1) instead of outside.

Figure 4:
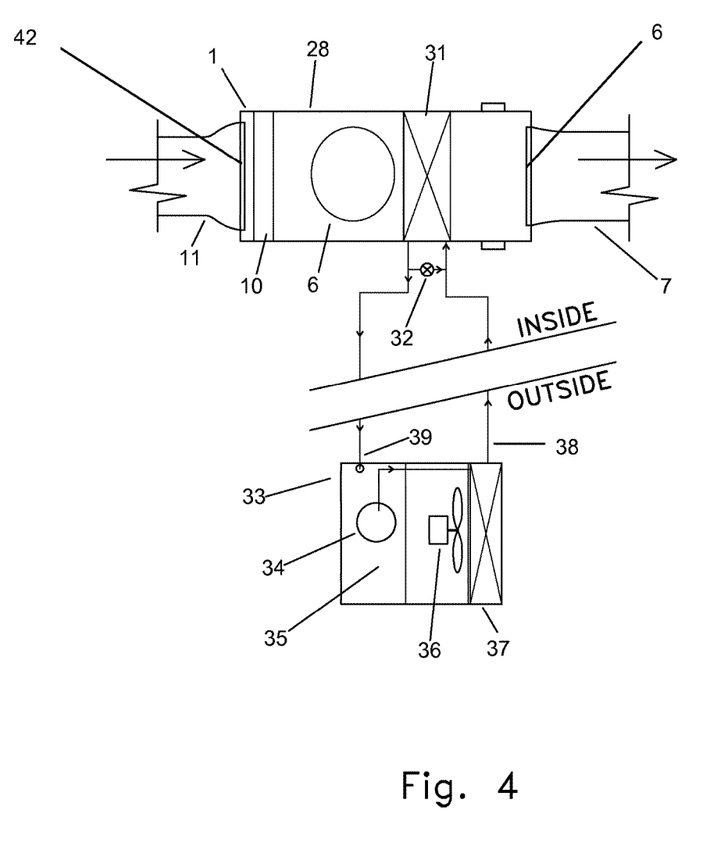
FIG. 4: is a perspective view of an air handling container coupled with an external chilling unit in one embodiment thereof.
Figure 5:
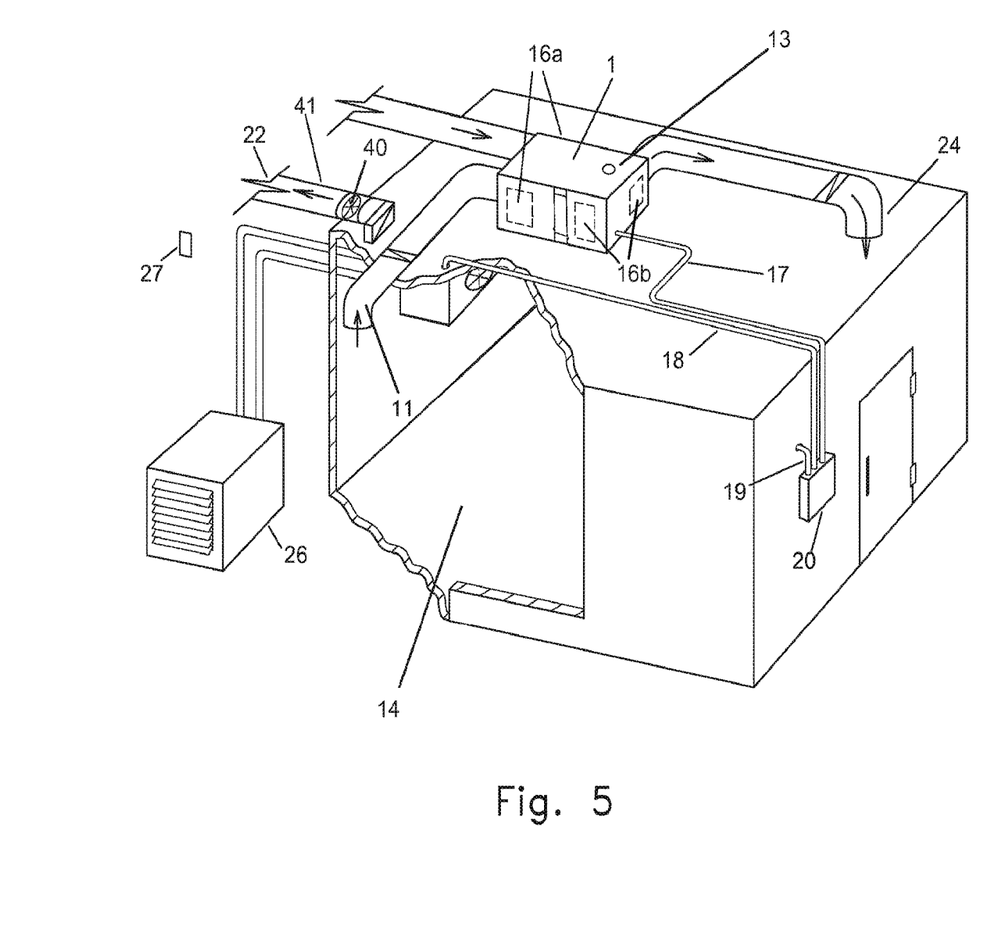
FIG. 5: is an additional depiction of an embodiment which contains ducts and an air handling container, as such may be installed on a refrigerated space as one example.

As shown in FIG. 4, one possible embodiment of the invention may include an external ambient air chilled fluid coil refrigeration system. In this embodiment, an air handling container (1) may be coupled to at least one return air duct (1) and maybe be further coupled to an enclosed refrigerated space (14). In addition, the air handling container (1) may also be coupled to at least one external air duct (12) that may be further coupled to an enclosed refrigerated space (14). It should be noted that such couplings may form fluidically coupled joints allowing for the free flow of air among the various described element. In this embodiment, at least one fluid heat transfer chiller coil (31) may be internally positioned within the air handling container (1) such that air drawn into the chamber to be mixed may pass through the coil and be subsequently cooled, perhaps to a desired TD.

As shown in FIG. 4, this embodiment may further include at least one fluid mix valve (32) fluidically coupled with the fluid heat transfer chiller coil (31). This coil may be part of a closed loop system being coupled to an external chilling unit (33). This external chilling unit may include at least one warm fluid return line (39) and at least one cold fluid supply line (38) coupled with a fluid reservoir (35) having a quantity of cooling fluid, such as a mixture of water and glycerol. This cooling fluid may be pumped into an external chiller coil (37) that is fluidically coupled with said fluid reservoir (35) through to a cooling fluid pump (34). This cooling fluid may be cooled by the application of ambient external air, perhaps through at least one external air regulator (36), such as a fan element positioned so as to transmit external ambient air onto said external chiller coil (37).

Again, referring to FIG. 4, this cooling fluid may be transmitted back into Internal fluid heat transfer chiller coil (31) where at least one air flow regulator (42) and/or an air displacement element (6) coupled with said air handling container (1) may regulate air flow from said return air duct across said fluid heat transfer chiller coil forming a quantity of conditioned air. Similar to above, this conditioned air may be redirected to a supply air duct (7) and into said enclosed refrigerated space (14).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention.

As can be easily understood from the foregoing, the basic concepts of the present invention may be embodied in a variety of ways. It involves both external ambient air refrigeration techniques as well as devices to accomplish the appropriate external ambient air refrigeration. In this application, the external ambient air refrigeration techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "regulator" should be understood to encompass disclosure of the act of "regulating"—whether explicitly discussed or not—and, conversely, were there effectively disclosure of the act of "regulating", such a disclosure should be understood to encompass disclosure of a "regulator" and even a "means for regulating." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

REFERENCES TO BE INCORPORATED BY REFERENCE IN ACCORDANCE WITH THE PATENT APPLICATION

I. U.S. Patent Documents

| Pat. No. | Kind Code | Issue Date | Name of Patentee or Applicant of cited Document |
|---|---|---|---|
| 7,629,141 | | 2009 Dec. 8 | Bruce, et al. |
| 5,239,834 | | 1993 Aug. 31 | Travers |
| 4,244,193 | | 1981 Jan. 3 | Haakenson |
| 4,178,770 | | 1979 Dec. 18 | Fox |
| 4,175,401 | | 1979 Nov. 27 | McManus |
| 4,023,947 | | 1977 May 17 | Ferry |
| 4,147,038 | | 1979 Apr. 3 | Hoebing et al. |
| 4,272,966 | | 1981 Jun. 16 | Niemann, et al. |

Thus, the applicant(s) should be understood to have support to claim and make a statement of invention to at least: i) each of the refrigeration devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Furthermore, it should be noted that certain embodiments of the current invention may indicate a coupler, or the step of coupling. It should be noted that these may indicate a direct or in some cases an indirect connection and/or bring together of disparate or non-disparate elements in a functional, non-functional or desired configuration.

In addition and as to computer, controller or sensor aspects and each aspect amenable to software, programming or other electronic automation, the applicant(s) should be understood to have support to claim and make a statement of invention to at least: xvi) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An ambient refrigeration system for an enclosed refrigerated space comprising:
    at least one air handling container connected to said enclosed refrigerated space through a supply air duct;
    at least one return air duct coupled to separately accept return air from said enclosed refrigerated space and configured to provide, at at least some times, air from said enclosed refrigerated space to said at least one air handling container;
    at least one mechanical refrigeration system not located inside said air handling container and responsive to said enclosed refrigerated space and configured to operate at at least some times, with air from said enclosed refrigerated space provided to said at least one air handling container;
    at least one external air duct coupled to an external environment, and configured to provide, at at least some times, cold external ambient air to said at least one air handling container, and thereby to said refrigerated space as a cooling medium independent from and without being fed through said at least one mechanical refrigeration system;
    at least one external-return air flow mix regulation controller;
    at least one external-return air flow mix regulator responsive to said external-return air flow mix regulation controller, coupled with said return air duct and said external air duct, and capable of regulating air flow into said air handling container, said external-return air flow mix regulator comprising:
        a return air damper responsive to said external-return air flow mix regulation controller; and
        an external air damper responsive to said external-return air flow mix regulation controller;
    wherein said supply air duct is capable of directing supply air into said enclosed refrigerated space, and wherein said mix regulation controller controls a quantity of said cold external ambient air drawn into said air handling container through said external air duct and controls a quantity of said refrigerated air drawn into said air handling container through said return air duct.

2. The ambient refrigeration system for an enclosed refrigerated space as described in claim 1, wherein said at least one external air duct coupled to an external environment, and configured to provide, at at least some times, cold external ambient air to said at least one air handling container, and thereby to said refrigerated space independent from and without being fed through said at least one mechanical refrigeration system comprises an enclosed space, cold external ambient air cooling medium external-return air flow mix regulation controller.

3. The ambient refrigeration system for an enclosed refrigerated space as described in claim 1, wherein said at least one external-return air flow mix regulator configures said external air damper and said return air damper so that either of said dampers can provide air to said at least one air handling container to cool said enclosed refrigerated space, but not both.

4. The ambient refrigeration system for an enclosed refrigerated space as described in claim 1, wherein said at least one external-return air flow mix regulator configures said external air damper based on a target temperature differential between the desired temperature of said enclosed refrigerated space and the temperature of said supply air.

5. The ambient refrigeration system for an enclosed refrigerated space as described in claim 1, wherein said enclosed refrigerated space comprises an enclosed refrigerated space not designed to be continuously lived in selected from the group consisting of: a walk-in cooler, a walk-in freezer, and a wine room.

6. The ambient refrigeration system for an enclosed refrigerated space as described in claim 1, wherein said at least one external-return air flow mix regulator responsive to said external-return air flow mix regulation controller, coupled with said return air duct and said external air duct, and capable of regulating air flow into said air handling container comprises an air flow regulator responsive to a sensor.

7. The ambient refrigeration system for an enclosed refrigerated space as described in claim 1, wherein said at least one external-return air flow mix regulator responsive to said external-return air flow mix regulation controller, coupled with said return air duct and said external air duct, and capable of regulating air flow into said air handling container comprises at least one air damper responsive to at least one damper actuator motor.

8. The ambient refrigeration system for an enclosed refrigerated space as described in claim 7, wherein said at least one air damper responsive to at least one damper actuator motor comprises at least one return air damper responsive to a damper actuator motor and at least one external air damper responsive to a damper actuator motor independently from said return air damper.

9. The ambient refrigeration system for an enclosed refrigerated space as described in claim 8, wherein said damper actuator motor to which said external air damper is responsive comprises a damper actuator motor responsive to said external-return air flow mix regulation controller.

10. The ambient refrigeration system for an enclosed refrigerated space as described in claim 8, wherein said damper actuator motor to which said external air damper is responsive comprises a damper actuator motor responsive to an outside air temperature sensor.

11. The ambient refrigeration system for an enclosed refrigerated space as described in claim 8, wherein said at least one air damper responsive to at least one damper actuator motor comprises an external air damper responsive to an outside air temperature sensor.

12. The ambient refrigeration system for an enclosed refrigerated space as described in claim 1, wherein said return air damper and said external air damper each comprise proportionally actuating air dampers.

13. The ambient refrigeration system for an enclosed refrigerated space as described in claim 8, wherein said at least one air damper responsive to at least one damper actuator motor comprises at least one reversible air damper.

14. The ambient refrigeration system for an enclosed refrigerated space as described in claim 1, wherein said at least one external-return air flow mix regulator responsive to said external-return air flow mix regulation controller, coupled with said return air duct and said external air duct, and capable of regulating air flow into said air handling container controls at least one fan.

15. The ambient refrigeration system for an enclosed refrigerated space as described in claim 14, wherein said at least one fan comprises a fan selected from the group consisting of: an inducer; a blower; an air-over fan; a belt driven fan; a squirrel cage fan; an in-line duct fan; a multi-speed fan; and a variable speed fan.

16. The ambient refrigeration system for an enclosed refrigerated space as described in claim 1, and further comprising at least one exhaust duct coupled with said enclosed refrigerated space.

17. The ambient refrigeration system for an enclosed refrigerated space as described in claim 16, wherein said at least one exhaust duct coupled with said enclosed refrigerated space comprises at least one exhaust duct coupled with said enclosed refrigerated space coupled with at least one back draft damper.

18. The ambient refrigeration system for an enclosed refrigerated space as described in claim 16, wherein said at least one exhaust duct coupled with said enclosed refrigerated space comprises at least one exhaust duct coupled with at least one exhaust duct fan.

19. The ambient refrigeration system for an enclosed refrigerated space as described in claim 16, wherein said at least one exhaust duct comprises at least one exhaust duct coupled with at least one exhaust duct fan.

20. The ambient refrigeration system for an enclosed refrigerated space as described in claim 1, wherein said at least one return air duct coupled to separately accept return air from said enclosed refrigerated space comprises at least one return air duct coupled with at least one return air back draft damper.

21. The ambient refrigeration system for an enclosed refrigerated space as described in claim 1, and further comprising an exhaust duct coupled to said enclosed refrigerated space, and coupled with at least one exhaust air back draft damper.

22. The ambient refrigeration system for an enclosed refrigerated space as described in claim 1, wherein said at least one return air duct coupled to separately accept return air from said enclosed refrigerated space comprises at least one return air duct coupled with at least one return air duct air displacement element.

23. The ambient refrigeration system for an enclosed refrigerated space as described in claim 22, wherein said at least one return air duct air displacement element comprises a fan.

24. The ambient refrigeration system for an enclosed refrigerated space as described in claim 23, wherein said fan comprises a fan selected from the group consisting of: an inducer; a blower; an air-over fan; a belt driven fan; a squirrel cage fan; an in-line duct fan; a multi-speed fan; and a variable speed fan.

25. The ambient refrigeration system for an enclosed refrigerated space as described in claim 1, wherein said at least one external air duct coupled to an external environment, and configured to provide, at at least some times, cold external ambient air to said at least one air handling container, and thereby to said refrigerated space independent from and without being fed through at least one mechanical refrigeration system comprises at least one external air duct coupled with at least one return air duct air displacement element.

26. The ambient refrigeration system for an enclosed refrigerated space as described in claim 25, wherein said at least one external air duct coupled with at least one return air duct air displacement element comprises a fan.

27. The ambient refrigeration system for an enclosed refrigerated space as described in claim 26, wherein said fan comprises a fan selected from the group consisting of: an inducer; a blower; an air-over fan; a belt driven fan; a squirrel cage fan; an in-line duct fan; a multi-speed fan; and a variable speed fan.

28. The ambient refrigeration system for an enclosed refrigerated space as described in claim 1, wherein said at least one mechanical refrigeration system responsive to said enclosed refrigerated space and configured to operate at at least some times, with air from said enclosed refrigerated space provided to said at least one air handling container comprises at least one mechanical evaporator coupled to at least one mechanical condenser.

29. The ambient refrigeration system for an enclosed refrigerated space as described in claim 1, wherein said at least one mechanical refrigeration system responsive to said enclosed refrigerated space comprises a mechanical refrigeration system responsive to a said at least one external-return air flow mix regulation controller.

30. The ambient refrigeration system for an enclosed refrigerated space as described in claim 1, wherein said at least one external-return air flow mix regulation controller comprises an external-return air flow mix regulation controller responsive to an outside air temperature sensor.

31. The ambient refrigeration for an enclosed refrigerated space system as described in claim 1, wherein said at least one mechanical refrigeration system responsive to said enclosed refrigerated space and configured to operate at at least some times, with air from said enclosed refrigerated space provided to said at least one air handling container comprises a mechanical refrigeration system selected from the group consisting of: an automatic mechanical refrigeration system; a manual mechanical refrigeration system; a modulating mechanical refrigeration system; and a proportionally actuating mechanical refrigeration system.

32. The ambient refrigeration system for an enclosed refrigerated space as described in claim 1, wherein said supply air comprises a quantity of conditioned air having a target temperature.

33. The ambient refrigeration system for an enclosed refrigerated space as described in claim 32, wherein said supply air comprises a quantity of conditioned air having a target temperature differential.

34. The ambient refrigeration system for an enclosed refrigerated space as described in claim 1, wherein said supply air comprises a quantity of conditioned air having a target humidity.

35. The ambient refrigeration system for an enclosed refrigerated space as described in claim 1, wherein said supply air comprises a quantity of conditioned air having a target air pressure.

36. The ambient refrigeration system for an enclosed refrigerated space as described in claim 1, wherein said supply air comprises a quantity of conditioned air having a target proportional mix of cold external ambient air and refrigerated air.

37. The ambient refrigeration system for an enclosed refrigerated space as described in claim 1, wherein said supply air duct capable of directing said supply air into said enclosed refrigerated space through said supply air duct, and further comprising an air displacement element selected from the group consisting of: an automatic air displacement element; a manual air displacement element; a modulating air displacement element; and a proportionally actuating air displacement element.

38. The ambient refrigeration system for an enclosed refrigerated space as described in claim 37, wherein said comprises an air displacement element responsive to said at least one external-return air flow mix regulation controller.

39. The ambient refrigeration system for an enclosed refrigerated space as described in claim 1, and further comprising at least one air displacement element responsive to an outside temperature sensor.

40. The ambient refrigeration system for an enclosed refrigerated space as described in claim 39, wherein said at least one air displacement element comprises at least one fan.

41. The ambient refrigeration system for an enclosed refrigerated space as described in claim 40, wherein said fan comprises a fan selected from the group consisting of: an inducer; a blower; an air-over fan; a belt driven fan; a squirrel cage fan; an in-line duct fan; a multi-speed fan; and a variable speed fan.

42. The ambient refrigeration system for an enclosed refrigerated space as described in claim 1, wherein said supply air duct comprises a supply air duct coupled with at least one back draft damper.

43. The ambient refrigeration system for an enclosed refrigerated space as described in claim 1, wherein said supply air duct comprises a supply air duct coupled with at least one supply air duct register.

44. The ambient refrigeration system for an enclosed refrigerated space as described in claim 1, and further comprising at least one sensor to which said at least one external-return air flow mix regulation controller is responsive.

45. The ambient refrigeration system for an enclosed refrigerated space as described in claim 44, wherein said at least one sensor comprises a sensor selected from the group consisting of: a supply air sensor; a supply air temperature sensor; a supply air pressure sensor; a supply air humidity sensor; an external air sensor; a temperature sensor; a humidity sensor; an air pressure sensor; and an air flow sensor.

46. The ambient refrigeration system for an enclosed refrigerated space as described in claim 1, and further comprising an ambient air refrigeration system modular retrofit kit comprising: said at least one air handling container; said external-return air flow mix regulation controller; and said external air damper.

47. The ambient refrigeration system for an enclosed refrigerated space as described in claim 46, wherein said external-return air flow mix regulation controller comprises a controller selected from the group consisting of: a wired controller; a wireless controller; a controller having a display element; an automatic controller; a manual controller; and a timed controller.

48. The ambient refrigeration system for an enclosed refrigerated space as described in claim 1, and further comprising at least one filter element to which said at least one external air duct coupled to an external environment is responsive.

49. The ambient refrigeration system for an enclosed refrigerated space as described in claim 48, wherein said at least one filter element comprises a filter element selected from the group consisting of: a pre-filter element; a secondary filter element; a supply outlet filter element; and an external outlet filter element.

50. The ambient refrigeration system for an enclosed refrigerated space as described in claim 48, wherein said at least one filter element comprises a filter element selected from the group consisting of: a charcoal filter; a HEPA filter; an Ultra-Violet (UV) light source; and a pleated filter.

51. The ambient refrigeration system for an enclosed refrigerated space as described in claim 48, and further comprising at least one filter access panel on said air handling container.

52. The ambient refrigeration system for an enclosed refrigerated space as described in claim 1, and further comprising a control that turns typical operation of said mechanical refrigeration system off.

53. The ambient refrigeration system for an enclosed refrigerated space as described in claim 1, and further comprising an ambient air control that is independent of operation of said mechanical refrigeration system.

54. The ambient refrigeration system for an enclosed refrigerated space as described in claim 1, wherein said return air damper responsive to said external-return air flow mix regulation controller and said external air damper responsive to said external-return air flow mix regulation controller work independently of each other.

55. The ambient refrigeration system for an enclosed refrigerated space as described in claim 1, wherein said at least one external-return air flow mix regulator configures said external air damper and said return air damper so that both of said dampers can simultaneously provide at least some air to said at least one air handling container to cool said enclosed refrigerated space.

56. The ambient refrigeration system for an enclosed refrigerated space as described in claim 1, wherein said at least one air handling container connected to said enclosed refrigerated space through a supply air duct comprises at least one ambient air refrigeration system modular retrofit kit.

57. The ambient refrigeration system for an enclosed refrigerated space as described in claim 1, wherein said ambient air refrigeration system comprises a plurality of coupled ambient air refrigeration systems coupled with at least one enclosed refrigerated space.

58. The ambient refrigeration system for an enclosed refrigerated space as described in claim 1, wherein said at least one air handling container comprises an insulated air handling container.

59. The ambient refrigeration system for an enclosed refrigerated space as described in claim 58, wherein said insulated air handling container comprises insulated air handling container selected from the group consisting of: a foam board insulated air handling container; a fibrous insulated air handling container; an internally insulated air handling container; and an externally insulated air handling container.

* * * * *